Dec. 19, 1961 D. E. DAILEY 3,013,436
DISPENSING MEASURE
Filed Nov. 28, 1958
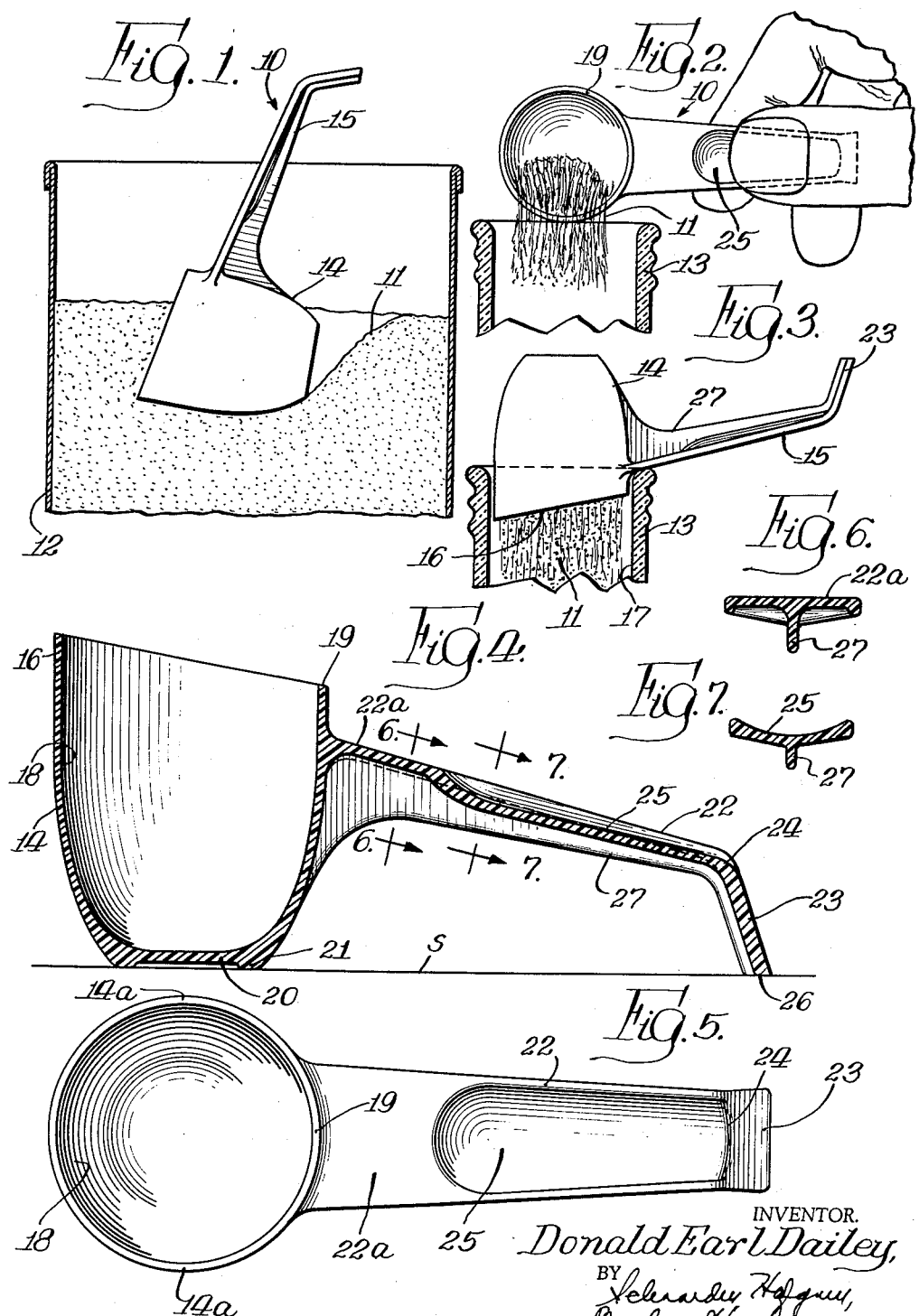
INVENTOR.
Donald Earl Dailey,
BY United States Patent Office 3,013,436
Patented Dec. 19, 1961

3,013,436
DISPENSING MEASURE
Donald Earl Dailey, Evansville, Ind., assignor to Mead Johnson & Company, a corporation of Indiana
Filed Nov. 28, 1958, Ser. No. 776,779
1 Claim. (Cl. 73—426)

This invention relates to dispensing means and in particular to a dispensing measure.

In certain processes, such as the preparation of infant's formula, a predetermined amount of powdered formula material is dispensed into a receptacle such as a nursing bottle. The powdered material is conventionally provided in relatively large containers holding sufficient material for a substantial number of such formula preparations. Conventionally, a person preparing one batch of the formula removes the desired quantity of the powdered material from the container and transfers it to the nursing bottle by means such as a spoon.

The use of such conventional spoon means in dispensing the powdered material has several serious disadvantages. One such disadvantage is that it is difficult for the average person to effect an accurate measurement with the conventional spoon means. Another disadvantage is that the conventional spoon means is relatively shallow and the powdered material may be readily spilled therefrom during the transfer operation. Still another disadvantage is that it is difficult, with such spoon means, to deliver the material from the spoon into the relatively small mouth of the conventional feeding bottle without spilling the material. Yet another disadvantage is that it is difficult to maintain such conventional utensils, such as spoons, exclusively for the use of such preparations and, resultingly, a non-sterile spoon may be employed or no spoon may be readily available.

Thus, proper and satisfactory measuring and dispensing of such material as infant's formula has presented a vexatious problem. Applicant has developed and herein discloses and claims a dispensing measure which obviates all of the disadvantages discussed above relative to the conventional means used in such processes. The principal object, therefore, of the instant invention is to provide a new and improved dispensing measure.

Another object is to provide such a dispensing measure permitting improved efficiency and facility in measuring and withdrawing a desired predetermined amount of material from a storage container.

A further object is to provide such a dispensing measure providing improved facility in the handling thereof during measuring and dispensing operations.

Still another object is to provide such a dispensing measure having a new and improved measuring cup and handle structure.

A still further object is to provide such a dispensing measure having improved stability in an upright position on a horizontal surface while having a small area of contact therewith.

Yet another object is to provide such a dispensing measure providing an improved dispensing of the measured material from the cup into a receiving receptacle.

A yet further object is to provide a new and improved dispensing measure arranged to guide the user's fingers to a desired proper grasping relationship therewith.

Other features and advantages of the invention will be apparent from the following description taken in connection with the accompanying drawing wherein:

FIG. 1 is a side elevation of a dispensing measure embodying the invention inserted into a body of material to be dispensed carried in a suitable storage container, the material and container being shown fragmentarily;

FIG. 2 is a view of the dispensing measure associated with a suitable receiving receptacle as in one step of a dispensing operation, the receptacle being shown fragmentarily;

FIG. 3 is a side elevation of the dispensing measure associated with the receiving receptacle, as in a final step in the dispensing operation;

FIG. 4 is an enlarged longitudinal medial section of the dispensing measure;

FIG. 5 is a plan view thereof;

FIG. 6 is a transverse section of the handle taken approximately along the line 6—6 of FIG. 4; and FIG. 7 is a transverse section taken approximately along the line 7—7 of FIG. 4.

A dispensing measure 10 embodying the invention is shown in FIGS. 1 through 3, as in dispensing a measured quantity of powdered or granular material, such as infant's formula 11, from a storage container 12 to a suitable receptacle such as a nursing bottle 13. Dispensing measure 10 comprises a new and improved structure including a cup element 14 and an associated handle 15 which permits improved facility in the removing of a measured quantity of powdered material 11 from container 12 and the dispensing of the measured quantity into the receptacle 13.

As seen in FIG. 1, a predetermined quantity of material 11 is readily scooped into cup element 14 by a simple swinging movement thereof through the body of material in container 12. In dispensing the measured quantity of material 11 from measure 10 into receptacle 13, the measure is turned about its longitudinal center line to cause the material to fall from the open end portion 16 of the cup element into a suitable opening 17 in receptacle 13. End portion 16 may then be inserted through opening 17. Cup element end portion 16 and opening 17 are dimensionally correlated so that, when so inserted, the cup element effectively closes the opening. To assure the dispensing of all of the granular material from the cup element, handle 15 may be manipulated to tap against the outer end of receptacle 13 and jar loose any material which may tend to cling to the inside of the cup element. The handle 15 is associated with the cup element so as to permit this tapping operation without a complete withdrawal of the open end 16 from opening 17. Thus, an accurate, spillproof dispensing of the measured quantity of material 11 is readily effected.

The novel structure of dispensing measure 10, which provides this improved measuring and dispensing functioning is best seen in FIGS. 4 through 7. Dispensing measure 10 may be formed of a readily maintainable material, such as a high impact plastic, permitting the molding of cup element 14 and handle 15 in integral association. The cup element 14 defines a recess 18 having a depth slightly greater than the width thereof and adapted accurately to hold a measured quantity of the material 11. The longitudinal cross section (see FIG. 4) of recess 18 is somewhat parabolic, effectively preventing the material 11 from being packed so tightly in the cup element as to hinder dispensing. The upper edge 19 of end portion 16 is defined by a plane extending at a large angle, in the order of 83°, to the longitudinal axis of the cup element. Thus, the projecting front portion of edge 19 provides an improved scooping action as the cup element is passed through the material 11. The lower, closed end 20 of the cup element is provided with a depending annular support boss 21 terminating downwardly in a plane extending perpendicular to the axis of the cup element to support the cup element in an upright position when the measure is placed on a horizontal surface S, while effectively minimizing the area of contact therewith. The lateral sidewall portions 14a of the cup element are rounded to have a line contact with surface S should the measure be inadvertently laid on its side on surface S.

Handle 15 extends laterally from cup element 14 from a point spaced substantially below upper edge 19, whereby end portion 16 has a substantial longitudinal extent assuring that it will not come out of the receptacle 13 during a tapping thereof in the dispensing operation, as discussed above, while yet the extension of the cup is not so long as to permit it to contact contents of the bottle. Further, handle 15 is connected to cup element 14 at a point substantially above bottom 20 thereof to permit the user to insert his fingers readily under the handle when desired. Handle 15 herein comprises an elongated portion 22 extending slightly downwardly from the cup element at an angle in the order of 75° to the axis of the cup element. Elongated portion 22 terminates short of the plane defining the bottom of annular boss 21, and a short end portion 23 extends from the outer end 24 of portion 22 to the plane of boss 21. End portion 23 is sufficiently long to space outer end 24 of elongated portion 22 sufficiently above surface S, when the dispensing measure is placed thereon as seen in FIG. 4, to permit disposition of the user's fingers around and under handle portion 22, thereby facilitating placement of the dispensing measure on surface S or a removal therefrom.

As best seen in FIGS. 5 through 7, handle 15 is relatively wide, thereby facilitating the manipulation of the dispensing measure by the operator's fingers. In addition, elongated portion 22 is provided with a thumb accommodating depression 25 which extends from outer end 24 to a point spaced a short distance from the cup element. The portion 22a of handle portion 22 extending between depression 25 and cup element 14 is undepressed and provides a rigid, receptacle tapping means for jarring adhering material loose from recess 18, as described above. The outer end 26 of end portion 23 extends substantially transversely of the handle and thus provides improved transverse stability to the dispensing measure when it is resting on surface S, serving to maintain the cup element in the upright position of FIG. 4. As an effectively minimum contact is had by boss 21 and handle end 26 with surface S, when the measure is resting thereon as seen in FIG. 4, the possibility of contamination of the device is substantially reduced.

To permit handle 15 to be relatively thin in cross section yet have sufficient rigidity to assure proper manipulation of the cup element in the measuring and dispensing operations, the handle is provided with a depending reinforcing rib 27. Rib 27 additionally provides an improved gripping means for co-operation with the folds of the operator's fingers extended under the handle, further facilitating the use of the dispensing measure.

The angular relationships of the handle 15 and upper edge 19 of the cup element relative to the longitudinal axis, or center line, of the cup element are correlated in dispensing measure 10 to provide improved ease in the scooping of the powdered material 11 from container 12, thereby facilitating a proper and accurate measurement of the quantity of material 11 being dispensed. Thus, the handle 15 is disposed at a convenient angle during a scooping operation, permitting the deeply recessed cup element effectively to retain the accurately measured quantity of material therein. The relatively large angle of upper edge 19 to the cup axis facilitates scooping of any last remaining small portion of the powdered material in the container 12. The generally transverse relationship of the cup element axis and the longitudinal extent of the handle permits upper end portion 16 of the cup element to be readily turned over and inserted through opening 17 of the receptacle 13 without spilling of the material during the inserting operation. The cup element effectively closes receptacle opening 17, when so inserted, and the susbtantial longitudinal extent of end portion 16 within opening 13 permits the tapping of the dispensing measure to loosen any adhering powdered material remaining in recess 18 while maintaining the end portion within the receptacle. Further, handle 15 limits the insertion of the cup element into opening 17 precluding inadvertent contact of the measure with the contents of the receptacle and precludes the measure from falling completely into the receptacle. Additionally, the novel structure of handle 15 permits the ready stabilizing of the cup of the dispensing measure in an upright position, as seen in FIG. 4, on a suitable horizontal surface and permits the ready grasping of the handle by the operator when desired. The thumb receiving depression 25 automatically guides the user's thumb to a proper position wherein the thumb and forearm of the user are substantially aligned with the longitudinal center line of the handle. Thus, the dispenser may be readily swung through the material in container 11 to fill the cup 14 and then turned to deliver its contents into the receptacle by simple aid natural rolling wrist actions.

While I have shown and described one embodiment of my invention, it is to be understood that it is capable of many modifications. Changes, therefore, in the construction and arrangement may be made without departing from the spirit and scope of the invention as defined in the appended claim.

I claim:

A dispensing means for manually transferring a preselected quantity of material from a supply to a receptacle, comprising: a deep cup generally defining a hyperboloid of revolution about a center line, the volume of said cup being accurately preselected to correspond to the preselected quantity of material, said cup having a bottom portion extending generally in a plane perpendicular to said center line; and a handle extending from said cup transversely to said center line thereof, the outer, open end of said cup being defined by an edge being substantially fully in a plane inclined at a small angle to said plane of the bottom portion with the greatest spacing of said edge outwardly from said plane of the bottom portion being opposite the portion of the cup from which the handle extends, thereby to provide improved facility in scooping the material from the supply, said handle being secured to the cup at a point spaced a small distance from said open end of the cup and inclined to said plane of the bottom portion at a small angle at least as large as the angle of the plane of said upper edge thereto, thereby to permit the handle to be tapped against an edge of the receptacle while the open end of the cup is movably maintained in an inverted position within the receptacle below the edge thereof.

References Cited in the file of this patent

UNITED STATES PATENTS

| | | |
|---|---|---|
| D. 127,543 | Strand | May 27, 1941 |
| D. 181,574 | Bowlen | Dec. 3, 1957 |
| 265,390 | Cosbey | Oct. 3, 1882 |
| 449,147 | Welch | Mar. 31, 1891 |
| 1,121,701 | Willis | Dec. 22, 1914 |
| 2,592,192 | Sanford | Apr. 8, 1952 |
| 2,603,093 | Cordova | July 15, 1952 |